United States Patent
Zhang et al.

(10) Patent No.: US 9,394,421 B2
(45) Date of Patent: Jul. 19, 2016

(54) METHOD OF MANUFACTURE FOR GRAPHENE FLUOROPOLYMER DISPERSION

(71) Applicant: Xerox Corporation, Norwalk, CT (US)

(72) Inventors: Qi Zhang, Milton (CA); Yu Qi, Oakville (CA); Sandra J. Gardner, Oakville (CA); Nan-Xing Hu, Oakville (CA)

(73) Assignee: Xerox Corporation, Norwalk, CT (US)

( * ) Notice: Subject to any disclaimer, the term of this patent is extended or adjusted under 35 U.S.C. 154(b) by 387 days.

(21) Appl. No.: 14/044,190

(22) Filed: Oct. 2, 2013

(65) Prior Publication Data
US 2015/0093511 A1   Apr. 2, 2015

(51) Int. Cl.
| | |
|---|---|
| *B05D 3/02* | (2006.01) |
| *C08K 3/04* | (2006.01) |
| *C08K 5/54* | (2006.01) |
| *C08J 3/215* | (2006.01) |

(52) U.S. Cl.
CPC . *C08K 3/04* (2013.01); *C08J 3/215* (2013.01); *C08K 5/5406* (2013.01)

(58) Field of Classification Search
CPC ......... C08K 3/04; C08K 5/5406; C08J 3/215; C09D 127/18; C08L 69/00
USPC ..................................................... 427/385.5
See application file for complete search history.

(56) References Cited

U.S. PATENT DOCUMENTS

| | | |
|---|---|---|
| 7,312,011 B2 | 12/2007 | Patel et al. |
| 8,173,337 B2 | 5/2012 | Kelly et al. |

OTHER PUBLICATIONS

Kandanur et al., "Suppression of wear in graphene polymer composites," Carbon. 2011, pp. 1-6.
Author Unknown, "Graphene Nanoplatelets," STREM, pp. 1-2, http://www.strem.com/uploads/resources/documents/graphene_nanoplatelets.pdf. Accessed Mar. 14, 2016.

*Primary Examiner* — Robert S Walters, Jr.
(74) *Attorney, Agent, or Firm* — Hoffman Warnick LLC

(57) ABSTRACT

A method for forming a dispersion includes mixing graphene particles, a fluorosilane coupling agent and a first solvent to produce a first dispersion wherein the graphene particles are from about 0.1 to about 0.8 weight percent of the first dispersion. The method includes concentrating the first dispersion by removing the first solvent to produce a second dispersion wherein the graphene particles are from about 2.0 to about 10.0 weight percent of the concentrated dispersion. The concentrated dispersion is mixed with a fluoropolymer dispersion including a second solvent, a surfactant, and fluoropolymer particles wherein the fluoropolymer dispersion has a solids content of about 30 weight percent to about 50 weight percent to form a second dispersion. A polymer binder in a third solvent is mixed with the second dispersion to form the coating dispersion.

20 Claims, 1 Drawing Sheet

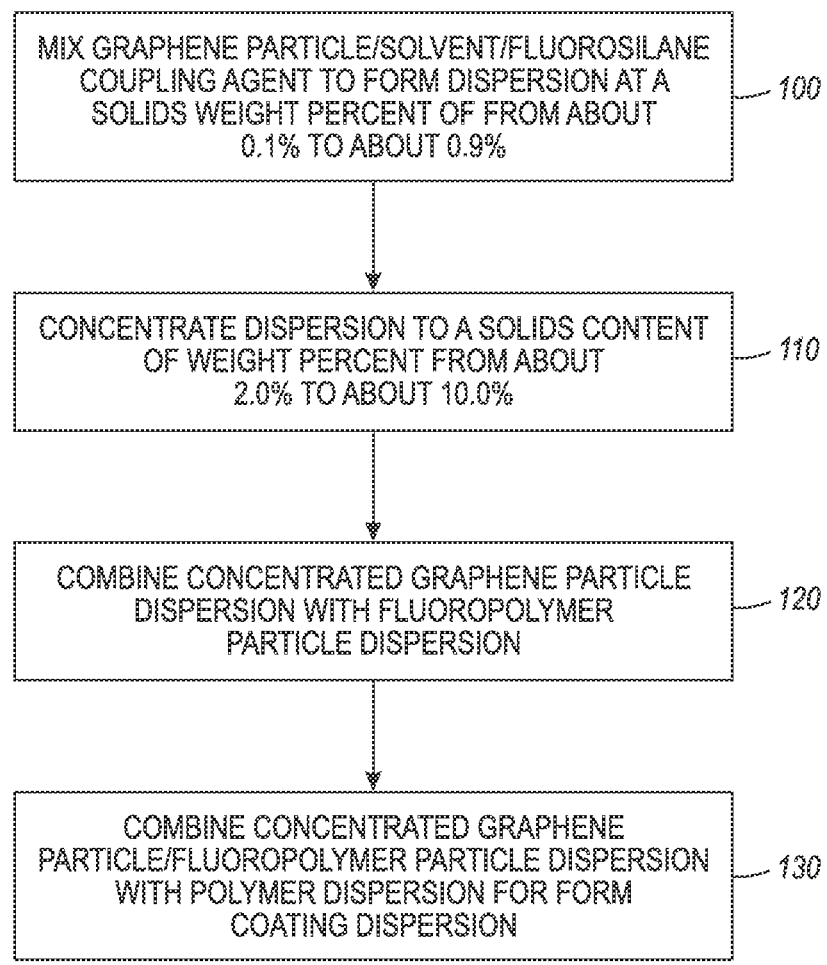

METHOD OF MANUFACTURE FOR GRAPHENE FLUOROPOLYMER DISPERSION

CROSS REFERENCE TO RELATED APPLICATIONS

This application relates to commonly assigned copending application Ser. No. 14/044,446 entitled "Graphene and Fluoropolymer Composite."

BACKGROUND

1. Field of Use

The present disclosure is directed to a method of making a graphene particle/fluoropolymer particle dispersion.

2. Background

Fluoropolymers are employed in a wide variety of applications. Examples include hydrophobic coatings for anti-contamination, anti-sticking and self-cleaning surfaces; chemically resistant and/or thermally stabile plastic or elastic components in consumer and industrial applications; lubricating and/or protective coatings; xerographic components, such as outer release coatings for fusers, as well as a variety of other applications. Fluoropolymer materials, including fluoroplastics such as polytetrafluoroethylene (PTFE) and perfluoroalkoxy polymer resin (PFA) are often applied in the form of dispersed particles.

Another nano-particle material that has recently garnered significant attention is graphene. Graphene is often described as a two dimensional sheet of sp2 bonded carbon atoms arranged in a hexagonal lattice. Due to unique structural features, graphene possesses superior thermal and electrical conductivity, as well as high mechanical strength. Incorporation of graphene into fluoroplastics can improve thermal and/or electrical conductivity and mechanical robustness of the resulting composite material. Both individual graphene sheets and graphene platelets, which include a plurality of graphene layers, show enormous potential as fillers for composite applications.

However, it is challenging to make uniform, well-dispersed graphene/fluoroplastic dispersions. Moreover, the ability to coat the dispersions is dependent on the coating process used. Phase separations and graphene agglomerations are often associated with graphene particle/fluoropolymer particle dispersions.

It would be desirable to have a method of making a stable, long life graphene particle/fluoropolymer particle coatable dispersion for use in manufacturing.

SUMMARY

There is provided a method for making a coating dispersion. The method includes mixing graphene particles, a fluorosilane coupling agent and a first solvent to produce a first dispersion wherein the graphene particles are from about 0.1 to about 0.8 weight percent of the first dispersion. The method includes concentrating the first dispersion by removing the first solvent to produce a second dispersion wherein the graphene particles are from about 2.0 to about 10.0 weight percent of the concentrated dispersion. The concentrated dispersion is mixed with a fluoropolymer dispersion including a second solvent, a surfactant, and fluoropolymer particles wherein the fluoropolymer dispersion has a solids content of about 30 weight percent to about 50 weight percent to form a second dispersion. A polymer binder in a third solvent is mixed with the second dispersion to form the coating dispersion. The coating dispersion has a viscosity of from about 10 centipoise to about 200 centipoise.

Disclosed herein is a method of manufacturing a surface layer. The method includes mixing graphene particles, a fluorosilane coupling agent and a first solvent to produce a first dispersion. The graphene particles are from about 0.1 to about 0.8 weight percent of the first dispersion. The first dispersion is concentrated by removing the first solvent and the fluorosilane coupling agent to produce a concentrated dispersion wherein the graphene particles comprise from about 2.0 to about 10.0 weight percent of the concentrated dispersion. The concentrated dispersion is mixed with a PFA dispersion that includes a second solvent, a surfactant, and PFA particles to form a second dispersion. The PFA dispersion has a solids content of about 30 weight percent to about 50 weight percent. Polymer binder in a third solvent is added to the second dispersion to form a coating dispersion. The coating dispersion has a viscosity of from about 10 centipoise to about 200 centipoise. A substrate is provided and coated with the coating dispersion. The coating dispersion is cured to form a surface layer.

There is provided a method for making a coating dispersion. The method includes mixing graphene particles, a fluorosilane coupling agent and a first solvent to produce a first dispersion wherein the graphene particles are from about 0.1 to about 0.8 weight percent of the first dispersion. The method includes concentrating the first dispersion by removing the first solvent to produce a second dispersion wherein the graphene particles are from about 2.0 to about 10.0 weight percent of the concentrated dispersion. The concentrated dispersion is mixed with a fluoropolymer dispersion including a second solvent, a surfactant, and fluoropolymer particles wherein the fluoropolymer dispersion has a solids content of about 30 weight percent to about 50 weight percent to form a second dispersion. Poly(alkylene carbonate) in a third solvent is mixed with the second dispersion to form the coating dispersion. The coating dispersion has a viscosity of from about 10 centipoise to about 200 centipoise.

BRIEF DESCRIPTION OF THE DRAWINGS

The accompanying drawings, which are incorporated in and constitute a part of this specification, illustrate several embodiments of the present teachings and together with the description, serve to explain the principles of the present teachings.

FIG. 1 is a flow chart of the process in accordance with the present teachings.

It should be noted that some details of the FIGURES have been simplified and are drawn to facilitate understanding of the embodiments rather than to maintain strict structural accuracy, detail, and scale.

DESCRIPTION OF THE EMBODIMENTS

Reference will now be made in detail to embodiments of the present teachings, examples of which are illustrated in the accompanying drawings. Wherever possible, the same reference numbers will be used throughout the drawings to refer to the same or like parts.

In the following description, reference is made to the accompanying drawings that form a part thereof, and in which is shown by way of illustration specific exemplary embodiments in which the present teachings may be practiced. These embodiments are described in sufficient detail to enable those skilled in the art to practice the present teachings and it is to be understood that other embodiments may be utilized and that changes may be made without departing from the scope of the present teachings. The following description is, therefore, merely exemplary.

Illustrations with respect to one or more implementations, alterations and/or modifications can be made to the illustrated examples without departing from the spirit and scope of the appended claims. In addition, while a particular feature may have been disclosed with respect to only one of several implementations, such feature may be combined with one or more other features of the other implementations as may be desired and advantageous for any given or particular function. Furthermore, to the extent that the terms "including", "includes", "having", "has", "with", or variants thereof are used in either the detailed description and the claims, such terms are intended to be inclusive in a manner similar to the term "comprising." The term "at least one of" is used to mean one or more of the listed items can be selected.

Notwithstanding that the numerical ranges and parameters setting forth the broad scope of embodiments are approximations, the numerical values set forth in the specific examples are reported as precisely as possible. Any numerical value, however, inherently contains certain errors necessarily resulting from the standard deviation found in their respective testing measurements. Moreover, all ranges disclosed herein are to be understood to encompass any and all sub-ranges subsumed therein. For example, a range of "less than 10" can include any and all sub-ranges between (and including) the minimum value of zero and the maximum value of 10, that is, any and all sub-ranges having a minimum value of equal to or greater than zero and a maximum value of equal to or less than 10, e.g., 1 to 5. In certain cases, the numerical values as stated for the parameter can take on negative values. In this case, the example value of range stated as "less than 10" can assume negative values, e.g. −1, −2, −3, −10, −20, −30, etc.

There is a need to develop a process of making uniform graphene particle/fluoropolymer particle dispersions to fully realize the unique combination of the properties derived from graphene particles. It is especially challenging to make disperse graphene particles in fluoroplastic particles. When graphene particles and fluoropolymer particles are combined in a dispersion the mixture shows phase separation as the graphene particles tend to agglomerate and separate out from fluoropolymer particles. A composite coating made from such a dispersion contained voids which are formed from the agglomerates of graphene particles.

An embodiment of the present disclosure is directed to a process for making a coating dispersion. The process includes mixing graphene particles in a solvent and a fluorosilane coupling agent. The dispersion is concentrated. The concentrated dispersion is mixed with a fluoropolymer dispersion containing fluoropolymer particles, a solvent and a surfactant to form a second dispersion. A polymer particle binder dispersion is added to the second dispersion to create the coating dispersion. The coating dispersion is suitable for coating, in embodiments, by a flow coating process allowing the manufacture of a void free coating.

To effectively make a dispersion of graphene particles and fluoropolymer particles, a process flow chart is provided in FIG. 1. Graphene particles are dispersed by mixing in a suitable solvent, such as cyclohexanone (CHN), with a fluorosilane coupling agent (FIG. 1, 100). The solids content of the graphene particles in the dispersion is from about 0.1 weight percent to about 0.9 weight percent. In embodiments, the weight percent of the graphene particles in the dispersion is from about 0.2 weight percent to about 0.8 weight percent, or from about 0.25 weight percent to about 0.75 weight percent. An ultrasonic processor is used to disperse the graphene particles in the solvent. Long sonication process time is needed for good dispersion quality. Typically from about 1 hour to about 100 hours of sonication is required for adequate mixing. Typically, the power output ranged from about 50 percent to about 90 percent. By mixing the graphene particles and fluorosilane coupling agents, a graphene particle dispersion is formed. Other desired ingredients can be included in the graphene particle dispersion, such as solvents or dispersants.

The dispersion is concentrated (FIG. 1, 110) to remove liquids, mostly solvent some of the fluorosilane coupling agent. The concentration step is accomplished by washing and centrifuging. The dispersion is centrifuged for about 20 minutes to about 60 minutes at a rotation speed of about 3500 rpm. The upper liquid layer is decanted and same amount of the solvent was added for washing. The dispersion is sonicated to redisperse the particles. The centrifuge step and washing steps are repeated multiple times to remove the excessive surfactants. The final collection of the graphene particle dispersion is saved for the next step process. The solids content of the concentrated graphene particle dispersion is from about 1.0 weight percent to about 10 weight percent. In embodiments, the weight percent of the graphene particles in the concentrated dispersion is from about 2.0 weight percent to about 10.0 weight percent, or from about 2.5 weight percent to about 9.0 weight percent. It is beneficial to provide free flowing graphene particle dispersions at higher weight concentrations of the graphene particles.

The concentrated graphene particle dispersion is then combined with a fluoropolymer particle dispersion by mixing (FIG. 1, 120). Sonication provides the highest energy to break particle clumps apart and is the most efficient method to exfoliate the layered graphene platelets/particles. Other ways to disperse graphene particles include ball milling. For the present disclosure uniformly distribution of the graphene particles is critical. The fluoropolymer dispersion is at a solids content of about 30 weight percent to about 50 weight percent based on the weight of the fluoropolymer dispersion. In embodiments, the weight percent of the fluoropolymer particle dispersion is from about 32 weight percent to about 48.0 weight percent, or from about 35 weight percent to about 45 weight percent. The solid content determines the coating thickness according to the different coating technologies. The solids content disclosed herein provides a coating thickness of from about 20 microns to 50 microns. The fluoropolymer dispersion contains a surfactant. The weight percent of the surfactant for the coating dispersion is from 0.1 to 5 weight percent of the total fluoropolymer. In embodiments, the weight percent of the surfactant is from about 0.5 weight percent to about 3.0 weight percent, or from about 1 weight percent to about 2 weight percent.

A polymer binder is then added and mixed with the graphene particle/fluoropolymer particle dispersion (FIG. 1, 130). The resulting dispersion is then ready to be coated and cured. The polymer binder is dissolved in the solvent, at about 20 weight percent polymer binder. The polymer binder solution is added to the graphene/fluoropolymer dispersion prior to coating. The weight percent of the polymer binder is from about 1.0 weight percent to about 10.0 weight percent based on the weight of the fluoropolymer, or from about 2 weight percent to about 9.0 weight percent, or from about 4 weight percent to about 7 weight percent.

Graphene Particles

Any suitable type of graphene particles can be employed in the dispersion of the present disclosure. In an embodiment, the graphene particles can include graphene, graphene platelets and mixtures thereof. Graphene particles have a size of from about 5 nm to about 100 nm, or in embodiments form about 6 nm to about 90 nm, or from about 6 nm to about 70 nm. Graphene platelets are unique nanoparticles comprising short stacks of graphene sheets. They can have an average thickness of, for example, approximately 6 nm to approximately 8 nm. In an embodiment, they can have a relatively large per unit surface area, such as, for example, about 120 to 150 m$^2$/g. Such graphene-comprising particles are well known in the art.

Fluorosilane Coupling Agents

As described above, it is challenging to make uniform composite materials having well-dispersed graphene particles in fluoropolymer particles, such as PFA, due to graphene's nano-size material nature and general incompatibility with fluoropolymer particles. By sonication, graphene particles (FIG. 1, 100) to form a well dispersed dispersion that is subsequently processed for coating a fluoropolymer/graphene dispersion.

The fluorosilane coupling agents suitable in the present disclosure include compounds comprising $C_3$-$C_{16}$ fluorocarbon chain substituents, such as (3,3,3-trifluoropropyl)trichlorosilane, nonafluorohexyl trichlorosilane, nonafluorohexyl trimethoxysilane, pentafluorophenylpropyl trichlorosilane, (tridecafluoro-1,1,2,2-tetra-hydrooctyl)trichlorosilane), pentafluorophenylpropyl trialkoxysilanes, such as pentafluorophenylpropyl trimethoxysilane or pentafluorophenylpropyl triethoxysilane, perfluoroalkylethyltriethoxysilanes, perfluorododecyl-1H, 1H, 2H, 2H-triethoxysilane, (tridecafluoro-1,1,2,2-tetra-hydrooctyl)trialkoxysilanes, such as (tridecafluoro-1,1,2,2-tetrahydrooctyl)triethoxysilane and (tridecafluoro-1,1,2,2-tetrahydrooctyl)trimethoxylsilane, and p-trifluoromethyltetrafluorophenyltriethoxysilane.

In an embodiment, the fluorosilane coupling agent is a fluoroalkyl substituted trichlorosilane. In an embodiment, the fluoroalkyl substituent includes at least 5 or more carbon atoms substituted with fluorine. Examples include fluoroalkyl chains in which 6 or more of the carbon atoms, such as 6 to 10 or 12 of the carbon atoms, have carbon-fluorine bonds instead of carbon-hydrogen bonds. In an embodiment, the fluoroalkyl substituent is a linear carbon chain. If desired, the fluoroalkyl group can include some carbon atoms that are not substituted with fluorine. An example of a trichlorosilane with a linear fluoroalkyl group comprising 6 carbons with fluorine bonding is (tridecafluoro-1,1,2,2-tetra-hydrooctyl) trichlorosilane. Any other fluorosilane coupling agents that can provide a stable graphene particle/fluoropolymer particle dispersion can also be used.

Solvents

Examples of suitable organic solvents useful in the embodiments herein include ketones, such as methyl ethyl ketone, methyl isobutyl ketone, cyclohexanone and N-Methyl-2-pyrrolidone; amides, such as dimethylformamide; sulfoxides, such as dimethyl sulfoxide; alcohols, ethers, esters, hydrocarbons, chlorinated hydrocarbons, and mixtures of any of the above. One of ordinary skill in the art would be able to determine solvents suitable for dispersing graphene particles and fluoropolymer particles.

It may be that the solvents used in the dispersions, e.g. graphene particle dispersion, fluoropolymer particle dispersion and polymer particle binder dispersion, are not compatible with each other. If so, the solvent can be separated from the graphene particles after exfoliation and/or treatment with the fluorosilane coupling agent, but prior to mixing with the incompatible compounds. Alternatively, if the first solvent is compatible it can remain as part of the final composition.

Fluoropolymer Particles

The fluorosilane-treated graphene particle dispersion is mixed with a second dispersion including fluoropolymer particles. The fluoropolymer particle dispersion can be formed by any suitable method. In an embodiment, the fluoropolymer particle dispersion is formed by combining a fluoropolymer particles and a second solvent. The second solvent includes any suitable solvent for forming a dispersion of the fluoropolymer particles, such as any of the solvents listed above, and can be the same as or different from the solvent used in the graphene particle dispersion.

Fluoropolymer particles suitable for use in the fluoropolymer dispersion include fluoroplastics including a monomeric repeat unit that is selected from the group consisting of vinylidene fluoride, hexafluoropropylene, tetrafluoroethylene, perfluoroalkylvinylether, and mixtures thereof. Examples of fluoroplastics include polytetrafluoroethylene (PTFE); perfluoroalkoxy polymer resin (PFA); and copolymer of tetrafluoroethylene (TFE) and hexafluoropropylene (HFP), and mixtures thereof. The fluoroplastic particles provide chemical and thermal stability and have a low surface energy. The fluoroplastic particles have a melting temperature of from about 280° C. to about 400° C. or from about 290° C. to about 390° C. or from about 300° C. to about 380° C.

In embodiments, fluoropolymer particles suitable for use in the fluoropolymer dispersion include fluoroelastomer particles including the class of 1) copolymers of two of vinylidenefluoride, hexafluoropropylene, and tetrafluoroethylene; such as those known commercially as VITON A®, 2) terpolymers of vinylidenefluoride, hexafluoropropylene, and tetrafluoroethylene such as those known commercially as VITON B®; and 3) tetrapolymers of vinylidenefluoride, hexafluoropropylene, tetrafluoroethylene, and a cure site monomer, such as those known commercially as VITON GH® or VITON GF®. These fluoroelastomer particles are known commercially under various designations such as those listed above, along with VITON E®, VITON E 60C®, VITON E430®, VITON 910®, and VITON ETP®. The VITON® designation is a trademark of E.I. DuPont de Nemours, Inc. The cure site monomer can be 4-bromoperfluorobutene-1,1,1-dihydro-4-bromoperfluorobutene-1,3-bromoperfluoropropene-1,1,1-dihydro-3-bromoperfluoropropene-1, or any other suitable, known cure site monomer, such as those commercially available from DuPont. Other commercially available fluoropolymers include FLUOREL 2170®, FLUOREL 2174®, FLUOREL 2176®, FLUOREL 2177® and FLUOREL LVS 76®, FLUOREL® being a registered trademark of 3M Company. Additional commercially available materials include AFLAS™ a poly(propylene-tetrafluoroethylene), and FLUOREL II® (LII900) a poly(propylene-tetrafluoroethylenevinylidenefluoride), both also available from 3M Company, as well as the Tecnoflons identified as FOR-60KIR®, FOR-LHF®, NM® FOR-THF®, FOR-TFS® TH® NH®, P757® TNS®, T439 PL958® BR9151® and TN505®, available from Ausimont. The fluoroelastomer particles are cured at a temperature of from about 80° C. to about 250° C.

Polymer Binder Particles

The coating dispersion includes a polymer binder solution. Any suitable polymer binder particle which does not negatively affect the coating properties can be employed. Examples of suitable polymer binder particles include a poly (alkylene carbonate), such as poly(propylene carbonate), poly(ethylene carbonate), poly(butylene carbonate), poly(cyclohexene carbonate); a poly(acrylic acid), an acrylic copolymer, a methacrylic copolymer, a poly(methacrylic acid), and mixtures thereof. Examples of each of the listed polymer binder particles are well known in the art. The polymer binder particles can be present in any suitable amount, such as, for example, about 1 weight percent to about 10 weight percent, based on the total weight of fluoropolymer in the coating dispersion.

The polymer binder solution is combined with the graphene particle/fluoropolymer particle dispersion to stabilize the coating dispersion. The polymer binder particles stabilize the graphene particle/fluoropolymer particle dispersion to enable uniform deposition of graphene/fluoropolymer composite on substrates without significant phase separation during the coating process.

In an embodiment, the polymer binder is a sacrificial binder, meaning that some or all of the polymer binder decomposes during curing of the coating. The decomposition temperatures chosen can depend on the particular binder material used as well as the melting temperatures of the materials employed for the composite particles, among other things. For example, the PFA in graphene particle/PFA particle dispersion melts at temperatures of about 260° C. or higher. Therefore, temperatures high enough to melt and flow the PFA particles while at the same time thermally decomposing the binder can be used, while temperatures that are so high as to significantly decompose the PFA material or damage the underlying substrate are avoided. Examples of suitable temperatures for a poly(propylene carbonate) binder employed with PFA particle/graphene particle dispersion can range from about 260° C. or more, such as about 300° C. to about 360° C., or about 330° C. to about 350° C.

Coating Dispersion

The coating dispersion has a percent solids content based on total weight of the dispersion of from about 20 weight percent to about 80 weight percent. In an embodiment, the solids content in the coating dispersion is from about 25 weight percent to about 70 weight percent or from about 25 weight percent to about 60 weight percent.

The coating dispersion has viscosity of from about 10 centipoise to about 200 centipoise, or in embodiments from about 15 centipoise to about 180 centipoise or from about 20 centipoise to about 150 centipoise. The viscosity is required to so that the coating dispersion is coatable by know liquid coating processes. A viscosity lower than 10 centipoise or higher than 200 centipoise is not coatable through known liquid coating methods or produces an uneven coating.

In an embodiment, the coating dispersion of the present disclosure can include one or more additional conductive or non-conductive fillers. Examples of suitable fillers include metal particles, metal oxide particles, carbon nanoparticles, and carbon nanotubes. The amount of filler employed may depend on the desired properties of the product being manufactured. Any other desired ingredients can optionally be employed in the coating compositions of the present disclosure, including dispersing agents or solvents.

The coating dispersion can be deposited on a substrate by any suitable liquid coating method, such as flow-coating, dip-coating, spin-on coating and spray coating. The coatings can be heated to dry and/or cure the coating materials. In an example, composite coatings have been conveniently made by flow coating, followed by baking at temperatures above the fluoropolymer melting temperature (e.g., >300° C.). The resulting uniform graphene particle/fluoropolymer particle dispersion can be electrically conductive, thermally conductive and/or mechanically robust.

The coating dispersion is cured or melted at a temperature of from about 255° C. to about 360° C. or from about 280° C. to about 340° C.

The coating dispersion is suitable for use as in the release layer of a fuser member.

Specific embodiments will now be described in detail. These examples are intended to be illustrative, and not limited to the materials, conditions, or process parameters set forth in these embodiments. All parts are percentages by solid weight unless otherwise indicated.

EXAMPLES

Graphene powder was first dispersed by sonication in cyclohexanone (CHN) with a fluorosilane coupling agent (tridecafluoro-1,1,2,2-tetra-hydrooctyl)trichlorosilane) at a loading of about 0.5 weight percent graphene particles. The dispersion was then centrifuged to remove excessive solvent and the fluorosilane, followed by washing and centrifuging. This produced a graphene particle dispersion of about 3 weight percent. A PFA particle dispersion was formed and added to the 3 weight percent graphene particle dispersion to form graphene particle/PFA particle dispersions with 1 weight percent graphene particles and 2 percent graphene particles. The fluorosilane coupling agent dispersions were compared with graphene particle/PFA particle dispersions that were not treated with a fluorosilane coupling agent. The dispersions with no fluorosilane coupling agent showed phase separation.

A graphene particle dispersion was formed. 0.6 g (0.5 weight percent) of graphene particles, available from STREM Chemicals Inc. was dispersed in 120 g of cyclohexanone (CHN) solvent containing 0.6 g of tridecafluoro-1,1,2,2-tetra-hydrooctyl)trichlorosilane, available from Gelest Inc. The dispersion was sonicated for 2 hours. The graphene particle dispersion was concentrated to 3 weight percent of graphene particles by centrifuging for 20 minutes at 3,500 rpm.

A fluoropolymer particle dispersion was formed. 9 g of perfluoroalkoxy polymer resin powder, available from Dupont was dispersed in 8 g methyl ethyl ketone (MEK) and 3 g CHN with 0.36 g GF400. The dispersion was mixed by sonication for 30 minutes. 6.2 g of the concentrated graphene dispersion with fluorosilane treatment was added to the PFA/MEK/CHN dispersion. The combined dispersion was mixed by sonication for 30 minutes. 3.8 g poly(propylene carbonate) particles, available from Empower in CHN solution at 20 weight percent was added to the composite dispersion to form the coating dispersion. The coating dispersion was subjected to roll milling.

It will be appreciated that variants of the above-disclosed and other features and functions or alternatives thereof may be combined into other different systems or applications. Various presently unforeseen or unanticipated alternatives, modifications, variations, or improvements therein may be subsequently made by those skilled in the art, which are also encompassed by the following claims.

What is claimed is:

1. A method making a coating dispersion comprising:
   mixing graphene particles, a fluorosilane coupling agent and a first solvent to produce a first dispersion wherein the graphene particles comprise from about 0.1 to about 0.8 weight percent of the first dispersion;
   concentrating the first dispersion by removing the first solvent to produce a concentrated dispersion wherein the graphene particles comprise from about 2.0 to about 10.0 weight percent of the concentrated dispersion;
   mixing the concentrated dispersion with a fluoropolymer particle dispersion comprising a second solvent, a surfactant, and fluoropolymer particles wherein the fluoropolymer particle dispersion has a solids content of about 30 weight percent to about 50 weight percent to form a second dispersion; and adding polymer binder in a third solvent to the second dispersion to form the coating dispersion wherein the coating dispersion has a viscosity of from about 10 centipoise to about 200 centipoise.

2. The method of claim 1, wherein the first solvent is selected from the group consisting of: ketones, amides, sulfoxides, alcohols, ethers, esters, hydrocarbons and chlorinated hydrocarbons.

3. The method of claim 1, wherein the second solvent is selected from the group consisting of: ketones, amides, sulfoxides, alcohols, ethers, esters, hydrocarbons and chlorinated hydrocarbons.

4. The method of claim 1, wherein the third solvent is selected from the group consisting of: ketones, amides, sulfoxides, alcohols, ethers, esters, hydrocarbons and chlorinated hydrocarbons.

5. The method of claim 1, wherein the surfactant is selected from the group consisting of: poly(fluoroacrylate)-graft-poly(methyl methacrylate), fluorinated acrylate copolymer with pendant glycol groups, fluorinated acrylate copolymer with pendant perfluoroalkyl sulfonate groups and polyether copolymers with pendant trifluoroethoxy groups.

6. The method of claim 1, wherein the fluoropolymer particles comprise particles selected from the group consisting of: polytetrafluoroethylene (PTFE); perfluoroalkoxy polymer resin (PFA); copolymers of tetrafluoroethylene (TFE) and hexafluoropropylene (HFP); copolymers of two of vinylidenefluoride, hexafluoropropylene, and tetrafluoroethylene; terpolymers of vinylidenefluoride, hexafluoropropylene and tetrafluoroethylene; and tetrapolymers of vinylidenefluoride, hexafluoropropylene, tetrafluoroethylene, and a cure site monomer.

7. The method of claim 1, wherein the fluoropolymer particles are selected from the group consisting of: copolymers of two of vinylidenefluoride, hexafluoropropylene, and tetrafluoroethylene; terpolymers of vinylidenefluoride, hexafluoropropylene, and tetrafluoroethylene; and tetrapolymers of vinylidenefluoride, hexafluoropropylene, tetrafluoroethylene, and a cure site monomer.

8. The method of claim 1, wherein the fluorosilane coupling agent is selected from the group consisting of: (3,3,3-trifluoropropyl)trichlorosilane, nonafluorohexyl trichlorosilane, nonafluorohexyl trimethoxysilane, pentafluorophenylpropyl trichlorosilane, (tridecafluoro-1,1,2,2-tetra-hydrooctyl)trichlorosilane, pentafluorophenylpropyl trialkoxysilanes, perfluoroalkylethyltriethoxysilanes, and (tridecafluoro-1,1,2,2-tetra-hydrooctyl)trialkoxysilanes.

9. The method of claim 1, wherein the polymer binder is selected from the group consisting of: poly(alkylene carbonate), poly(acrylic acid), acrylic copolymer, methacrylic copolymer and poly(methacrylic acid).

10. The method of claim 1, wherein the coating dispersion has a solids content of from about 25 weight percent to about 60 weight percent.

11. A method of manufacturing a surface layer comprising:
mixing graphene particles, a fluorosilane coupling agent and a first solvent to produce a first dispersion wherein the graphene particles comprise from about 0.1 to about 0.8 weight percent of the first dispersion;
concentrating the first dispersion by removing the first solvent and the fluorosilane coupling agent to produce a concentrated dispersion wherein the graphene particles comprise from about 2.0 to about 10.0 weight percent of the concentrated dispersion;

mixing the concentrated dispersion with a PFA dispersion comprising a second solvent, a surfactant, and PFA particles wherein the PFA dispersion has a solids content of about 30 weight percent to about 50 weight percent to form a second dispersion; and adding polymer binder in a third solvent to the second dispersion to form a coating dispersion wherein the coating dispersion has a viscosity of from about 10 centipoise to about 200 centipoise;

providing a substrate;

coating the coating dispersion on the substrate; and curing the coating dispersion.

12. The method of claim 11, wherein the first solvent is selected from the group consisting of: ketones, amides, sulfoxides, alcohols, ethers, esters, hydrocarbons and chlorinated hydrocarbons.

13. The method of claim 11, wherein the second solvent is selected from the group consisting of: ketones, amides, sulfoxides, alcohols, ethers, esters, hydrocarbons and chlorinated hydrocarbons.

14. The method of claim 11, wherein the third solvent is selected from the group consisting of: ketones, amides, sulfoxides, alcohols, ethers, esters, hydrocarbons and chlorinated hydrocarbons.

15. The method of claim 11, wherein the surfactant is selected from the group consisting of: poly(fluoroacrylate)-graft-poly(methyl methacrylate), fluorinated acrylate copolymer with pendant glycol groups, fluorinated acrylate copolymer with perfluoroalkyl sulfonate groups and polyether copolymers with pendant trifluoroethoxy groups.

16. The method of claim 11, wherein the coating dispersion has a solids content of from about 25 weight percent to about 60 weight percent.

17. The method of claim 11, wherein the polymer binder is selected from the group consisting of: poly(alkylene carbonate), poly(acrylic acid), acrylic copolymer, methacrylic copolymer and poly(methacrylic acid).

18. A method making a coating dispersion comprising:
mixing graphene particles, a fluorosilane coupling agent and a first solvent to produce a first dispersion wherein the graphene particles comprise from about 0.1 to about 0.8 weight percent of the first dispersion;
concentrating the first dispersion by removing the first solvent to produce a concentrated dispersion wherein the graphene particles comprise from about 2.0 to about 10.0 weight percent of the concentrated dispersion;
mixing the concentrated dispersion with a fluoropolymer particle dispersion comprising a second solvent, a surfactant, and fluoropolymer particles wherein the fluoropolymer particle dispersion has a solids content of about 30 weight percent to about 50 weight percent to form a second dispersion; and
adding poly(alkylene carbonate) in a third solvent to the second dispersion to form the coating dispersion wherein the coating dispersion has a viscosity of from about 10 centipoise to about 200 centipoise.

19. The method of claim 18, wherein the first solvent, the second solvent and the third solvent are selected from the group consisting of: ketones, amides, sulfoxides, alcohols, ethers, esters, hydrocarbons and chlorinated hydrocarbons.

20. The method of claim 18, wherein the coating dispersion has a solids content of from about 20 weight percent to about 80 weight percent.

* * * * *